United States Patent
Al Shahri et al.

(10) Patent No.: US 12,037,901 B2
(45) Date of Patent: Jul. 16, 2024

(54) AUTOMATED WELL PRODUCTIVITY ESTIMATION AND CONTINUOUS AVERAGE WELL PRESSURE MONITORING THROUGH INTEGRATION OF REAL-TIME SURFACE AND DOWNHOLE PRESSURE AND TEMPERATURE MEASUREMENTS

(71) Applicant: Saudi Arabian Oil Company, Dhahran (SA)

(72) Inventors: Ali M. Al Shahri, Dhahran (SA); Anas A. Al Shuaibi, Dammam (SA); Mohammed Sami Kanfar, Dammam (SA); Kalid Saad Dosary, Al-Khobar (SA); Abdulaziz A. Alsaleh, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 601 days.

(21) Appl. No.: 17/215,547

(22) Filed: Mar. 29, 2021

(65) Prior Publication Data
US 2021/0301659 A1   Sep. 30, 2021

Related U.S. Application Data

(60) Provisional application No. 63/002,466, filed on Mar. 31, 2020.

(51) Int. Cl.
*E21B 49/08* (2006.01)
*E21B 47/06* (2012.01)
*G01V 9/02* (2006.01)

(52) U.S. Cl.
CPC ............ *E21B 49/087* (2013.01); *E21B 47/06* (2013.01); *G01V 9/02* (2013.01); *E21B 2200/20* (2020.05); *E21B 2200/22* (2020.05)

(58) Field of Classification Search
CPC .... E21B 49/087; E21B 47/06; E21B 2200/20; E21B 2200/22; G01V 9/02
See application file for complete search history.

(56) References Cited

U.S. PATENT DOCUMENTS

| | | | |
|---|---|---|---|
| 4,836,284 A * | 6/1989 | Tinker | ............... C09K 8/72 166/308.1 |
| 9,423,526 B2 | 8/2016 | Abitrabi et al. | |

(Continued)

FOREIGN PATENT DOCUMENTS

| | | |
|---|---|---|
| WO | 2015073626 A1 | 5/2015 |
| WO | 2017040457 A2 | 3/2017 |

(Continued)

OTHER PUBLICATIONS

Poe et al., "Novel Methodology to Estimate Reservoir Pressure and Productivity Index in Unconventional and Conventional Reservoirs Using Production Data", Offshore Technology Conference 2016 (Year: 2016).*

(Continued)

*Primary Examiner* — Lina Cordero
*Assistant Examiner* — Lyudmila Zaykova-Feldman
(74) *Attorney, Agent, or Firm* — DINSMORE & SHOHL LLP

(57) ABSTRACT

Systems and methods for intelligent estimation of productivity index and reservoir pressure values using pressure sensors, a neural network model comprising historical flow rate data of at least a well bore, and a data processor. The pressure sensors generate pressure data associated with a well bore's surface point and a downhole point. The data processor, communicatively coupled to the two pressure sensors and the neural network model, is operable to receive the pressure data from the sensors respectively indicative of pressure at each of the two points, estimate a real-time productivity index value in real-time based on the pressure (Continued)

data from the pressure sensors and the historical flowrate data of the neural network model, and estimate a reservoir pressure value of the well bore at a flowing condition, a reservoir pressure value of the well bore at a shut-in condition, or both, based on the real-time productivity index.

20 Claims, 9 Drawing Sheets

(56) References Cited

U.S. PATENT DOCUMENTS

| | | | |
|---|---|---|---|
| 9,671,524 B2 | 6/2017 | Abitrabi et al. | |
| 10,316,625 B2 | 6/2019 | Garia Zurita et al. | |
| 10,643,146 B1 | 5/2020 | Basu et al. | |
| 2011/0098931 A1* | 4/2011 | Kosmala | E21B 47/00 |
| | | | 702/12 |
| 2013/0124171 A1 | 5/2013 | Schuette et al. | |
| 2014/0180658 A1* | 6/2014 | Rossi | E21B 49/00 |
| | | | 703/10 |
| 2019/0094414 A1 | 3/2019 | Prochnow et al. | |

FOREIGN PATENT DOCUMENTS

| | | | | |
|---|---|---|---|---|
| WO | WO-2017040457 A2 * | 3/2017 | | E21B 49/00 |
| WO | 2019222129 A1 | 11/2019 | | |

OTHER PUBLICATIONS

International Search Report and Written Opinion dated Jul. 9, 2021 pertaining to International application No. PCT/US2021/024586 filed Mar. 29, 2021, 16 pages.

* cited by examiner

AUTOMATED WELL PRODUCTIVITY ESTIMATION AND CONTINUOUS AVERAGE WELL PRESSURE MONITORING THROUGH INTEGRATION OF REAL-TIME SURFACE AND DOWNHOLE PRESSURE AND TEMPERATURE MEASUREMENTS

CROSS-REFERENCE TO RELATED APPLICATIONS

This application claims the benefit of U.S. Provisional Application Ser. No. 63/002,466, filed Mar. 31, 2020, entitled "AUTOMATED WELL PRODUCTIVITY ESTIMATION AND CONTINUOUS AVERAGE WELL PRESSURE MONITORING THROUGH INTEGRATION OF REAL-TIME SURFACE AND DOWNHOLE PRESSURE AND TEMPERATURE MEASUREMENTS," the entirety of which is incorporated by reference herein.

TECHNICAL FIELD

The present disclosure relates to automated real-time well productivity estimation and continuous average well pressure monitoring and, in particular, systems and methods for automated real-time well productivity estimation and continuous average well pressure monitoring through integration of real-time surface and downhole pressure and temperature measurements.

BACKGROUND

Manual pressure buildup surveys can be used to measure reservoir pressure and determine a productivity index of wells in a pipeline, but this may require long man-hours and resources, even for a single well. These types of surveys also involve shut-in conditions, where a well pump is shut down for static measurements. Very expensive budgets may be allocated for these manual jobs yearly as part of such a master surveillance plan. In addition to the production interruptions for each build acquired, data is usually limited and sparse, and is merely acquired intermittently on a quarterly basis. Further, the pressure behavior gathered in between is interpreted based on engineering judgment and may include faulty assumptions.

Accordingly, a need exists for an alternative measurement system for reservoir pressure measurement and determining a productivity index of wells that implements an expedited and streamlined solution that is efficient and cost-effective.

BRIEF SUMMARY

According to the subject matter of the present disclosure, an intelligent estimation system comprises at least two pressure sensors, a neural network model, and a data processor. The at least two pressure sensors are configured to generate pressure data respectively associated with two points of a well bore, the two points comprising a surface point of the well bore and a downhole point of the well bore. The neural network comprises historical flow rate data associated with at least a wellbore. The data processor is communicatively coupled to at least two pressure sensors and the neural network model and is operable to receive the pressure data from the at least two pressure sensors respectively indicative of pressure at each of the two points of the well bore, estimate a real-time productivity index value in real-time based on the pressure data from the at least two pressure sensors and the historical flowrate data of the neural network model, and estimate a reservoir pressure value of the well bore at a flowing condition, a reservoir pressure value of the well bore at a shut-in condition, or both, based on the real-time productivity index.

In accordance with one embodiment of the present disclosure, an intelligent estimation system comprises at least two pressure sensors, a neural network model, and a data processor, the at least two pressure sensors configured to generate pressure data respectively associated with two points of a well bore, the two points comprising a surface point of the well bore and a downhole point of the well bore of a plurality of well bores. The neural network model comprises historical flowrate data associated with at least a well bore. The data processor is communicatively coupled to the at least two pressure sensors and the neural network model and is operable to receive the pressure data from the at least two pressure sensors respectively indicative of pressure at each of the two points of the well bore, estimate a real-time productivity index value in real-time based on the pressure data from the at least two pressure sensors and the historical flowrate data of the neural network model, estimate a reservoir pressure value of the well bore at a flowing condition, a reservoir pressure value of the well bore at a shut-in condition, or both, based on the real-time productivity index, generate (i) a productivity index graphical representation comprising each real-time productivity index value for each well bore of the plurality of well bores, (ii) a reservoir pressure graphical representation comprising each reservoir pressure value of each well bore, (iii) or both, and display the productivity index graphical representation, the reservoir pressure graphical representation, or both.

According to another embodiment of the present disclosure, a method comprises pressure data respectively associated with two points of a well bore from at least two pressure sensors, the two points comprising a surface point of the well bore and a downhole point of the well bore, receiving historical flowrate data associated with at least a well bore from a neural network model, and receiving the pressure data from the at least two pressure sensors respectively indicative of pressure at each of the two points of the well bore. The method further comprises estimating a real-time productivity index value in real-time based on the pressure data and the historical flowrate data of the neural network model, and estimating a reservoir pressure value of the well bore at a flowing condition, a reservoir pressure value of the well bore at a shut-in condition, or both, based on the real-time productivity index.

Although the concepts of the present disclosure described herein with primary reference to estimating real-time productivity index values and reservoir pressure values, and generating and displaying a productivity index graphical representation, it is contemplated that other values and graphical representations may also be estimated and generated based on flow rate data.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
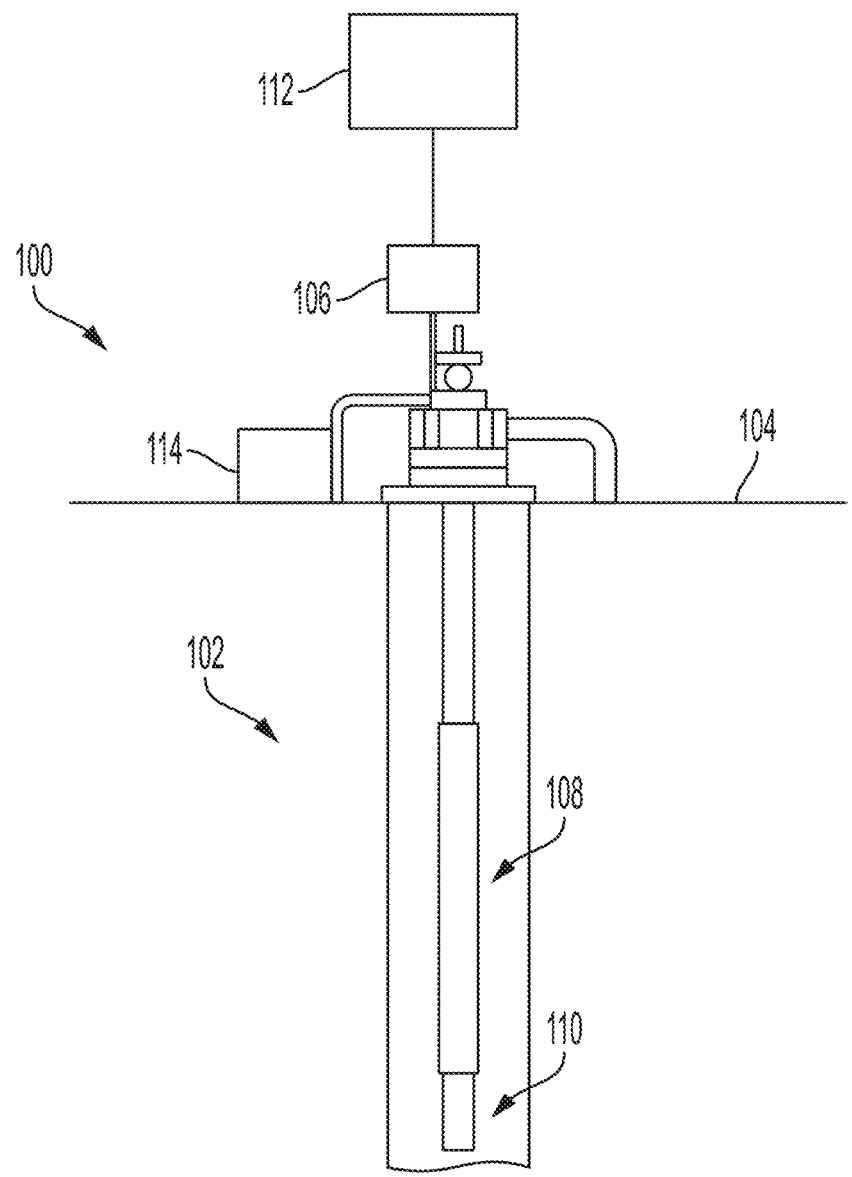
FIG. 1 schematically illustrates an intelligent measurement solution utilizing a data analytics module, according to one or more embodiments shown and described herein.

In embodiments described herein, an intelligent measurement module is described to implement systems and methods to generate an automated real-time well productivity estimation and continuous average well pressure monitoring. Embodiments of the present disclosure are directed to intelligent measurement systems and methods, as described in greater detail further below, to automate well productivity estimation and continuous average pressure monitoring for flowing wells through integration of real-time surface and downhole pressure and temperature measurements.

Embodiments described herein are directed to systems, methods, and computer programs for an automated productivity index (PI) estimation, real-time producing wells static bottom-hole pressure estimation at flowing condition, and static bottom hole pressure estimation at shut-in condition utilizing surface and downhole pressure and temperature real-time measurements. The embodiments of the present disclosure provide well performance and reservoir pressure evaluation with dependence on smart field equipment such as pressure and temperature sensors to avoid manual shut-in surveys, which require time and resources and tend to be costly. Thus, the embodiments of the present disclosure may minimize production interruptions for such manual pressure surveys as the present disclosure describes a continuous and automatic estimation at flowing conditions. The present disclosure includes an integrated complex workflow, as described in greater detail below, to provide a precise operation status per well and autonomously capture all historical buildups (planned and/or unplanned) to link to a most recent gross rate as measured through a flowmeter (e.g. Venturi based flowmeters, Coriolis based flowmeters, and other suitable flowmeters as known to one of ordinary skill in the art or yet-to-be-contemplated) or estimated through artificially intelligent systems and acquired prior to each buildup. Furthermore, pressure and temperature can also be reliably measured at surface through wellhead sensors and at subsurface through permanent downhole gauges or Electrical Submersible Pump (ESP) sensors. Through running the algorithms of the present disclosure to a field level, estimated PI's and reservoir pressures can be generated for all wells while creating historical trends and generating high resolution PI and isobaric (pressure) maps that change in real time.

Systems, methods, and computer programs as described herein, and in greater detail below, for such an automated productivity index (PI) estimation, real-time producing wells static bottom-hole pressure estimation at flowing condition, and static bottom hole pressure estimation at shut-in condition utilizing surface and downhole pressure and temperature real-time measurements provide a real-time, cost-efficient, and streamlined automated approach to generate such measurements. The present disclosure describes building algorithms that will automatically captures precise shut-in and flowing periods utilizing statistical approach to remove the noise in the data and to increase the confidence in the algorithms' outcome. By integrating the recent gross rate measured through a flowmeter or estimated through artificially intelligent systems acquired prior to each buildup, productivity index may be automatically calculated as described in greater detail further below. The algorithms described herein may further be deployed at field level to result in PI map generation for all completed reservoirs.

Referring to FIG. 1, for example, an intelligent measurement solution 100 utilizes at least a well comprising a well bore 102 to transmit temperature and pressure data of the well via one or more sensors to a data analytics module 112. The well bore 102 may house an ESP 108 coupled to the one or more sensors. The one or more sensors may include one or more temperature and/or pressure sensors 110 coupled to the ESP 108. The one or more sensors may further include a temperature and/or pressure sensor 106 on a ground surface 104 to transmit data to the data analytics module 112. The one or more sensors may further include a flowmeter 114 to transmit data to the data analytics model 112.

By way of example, and not as a limitation, the flowmeter 114 may be a water cut flowmeter to measure water content (cut) of crude oil and/or other hydrocarbons as they flow from a well and through a pipeline. A usual practice for measuring water cut is to have one multi-phase flowmeter per drill site or platform. Hydrocarbons such as oil from the wells is then flowed to the multiphase flowmeter from each well to measure water cut, and each measurement typically takes around a day to measure to allow the flow to stabilize. The flowmeter 114 may further be used to measure recent liquid gross rate.

Figure 2:
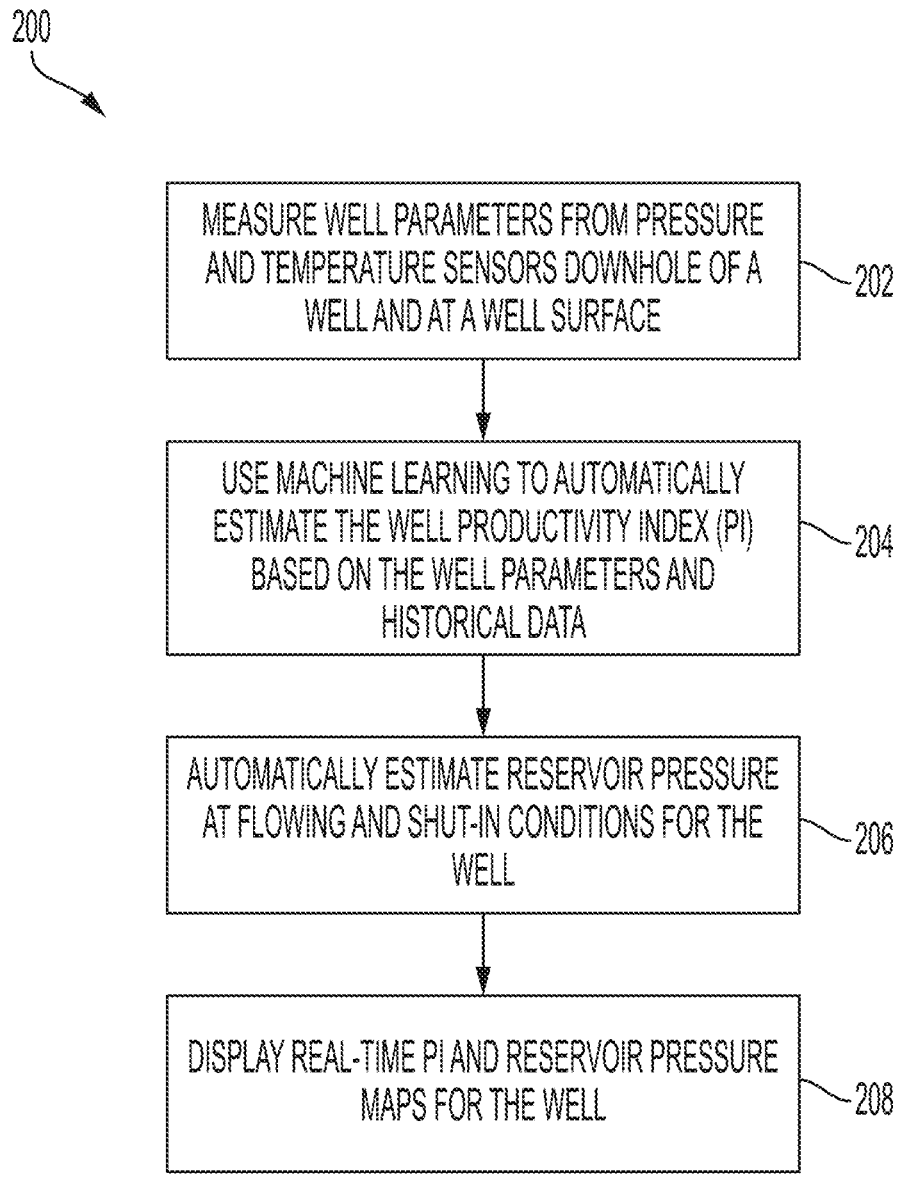
FIG. 2 illustrates a process for use of the intelligent measurement solution of FIG. 1, according to one or more embodiments shown and described herein.

Referring to FIG. 2, a process 200 for use of the intelligent measurement solution 100 of FIG. 1 is depicted and may be implemented by an intelligent measurement system 300 as described in greater detail below with respect to FIG. 9.

Figure 3:
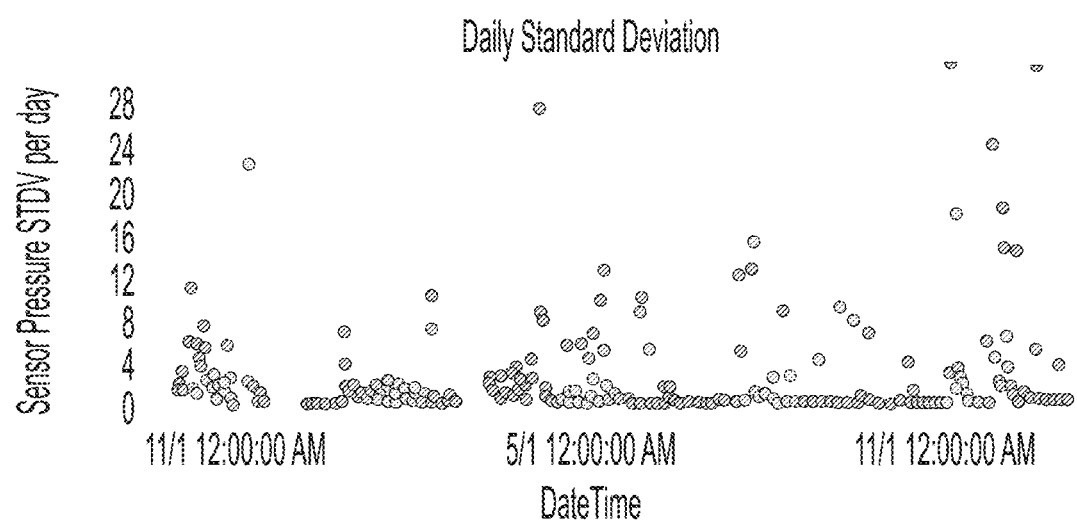
FIG. 3 illustrates a graphical depiction of measured pressure metric results from an exemplary use of the process of FIG. 2, according to one or more embodiments shown and described herein.
Figure 3:
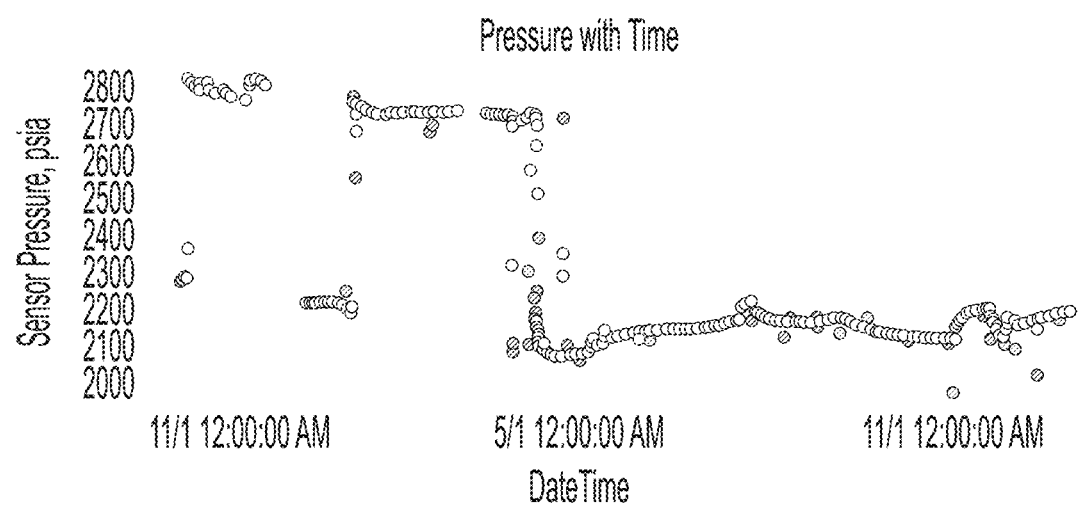

In block 202 of the process 200 of FIG. 2, well parameters are measured, including temperature and pressure, in and associated with the well bore 102 of FIG. 1 via the one or more sensors 106, 110. By way of example, and not as a limitation, well parameters are measured from pressure and temperature sensors downhole of the well 102 (e.g., the sensor 110) and at the ground surface 104 (e.g., the sensor 106). In an embodiment, the process 200 may employ utilizing such downhole or surface pressure sensors and a surface temperature sensor to achieve accurate and frequent surface flowrate measurements. Such rates can be estimated if the ESP 108 is available with pressure and temperature sensors 106, 110, as can be frequency and number of stages estimates. As shown in FIG. 3 described below, a statistical approach may be utilized to remove the noise in the sensors readings to capture the most representative values. Further, as shown via FIG. 4 described below, the well operation status of each well 102 may be determined utilizing a built workflow to track the exact pressure shut-in build ups periods and flowing periods of each well 102.

Figure 4:
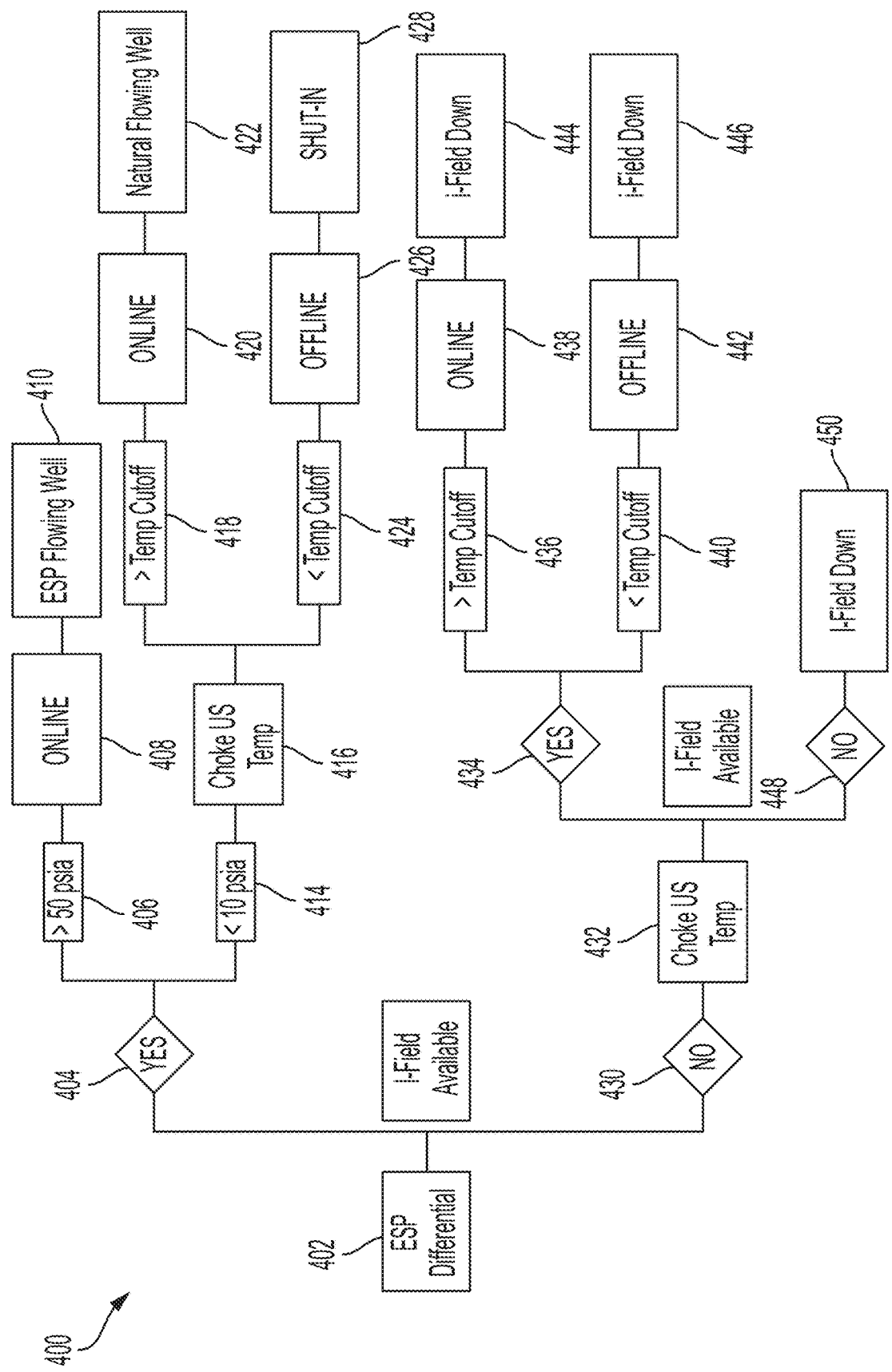
FIG. 4 illustrates a workflow used to determine whether a well is flowing or in a shut-off condition to use with the process of FIG. 2, according to one or more embodiments shown and described herein.

FIG. 3, described in greater detail below, depicts a graph view 230 illustrating a daily standard deviation graph illustrating sensor pressure SDTV values per day across a period of time and a pressure with time graph illustrating sensor pressure (in pounds per square inch absolution (psia)) across the period of time. FIG. 4, described in greater detail below, depicts a workflow 400 to determine whether a well 102 is flowing or in a shut-in condition. The values of FIG. 3 and determinations of FIG. 4 may be utilized to provide the well parameters of block 202 of the process 200 and to build historical data.

In block 204, machine learning is utilized to automatically determine at least a well Productivity Index (PI) based on the well parameters of block 202 and historical data of the well 102 as stored in a database. Using all historical buildup periods and flowmeter rate measurements or ESP rate estimation, the productivity index (PI) may be calculated. Sufficient data of shut-in history for the one or more wells 102 may aid to calibrate the model applied and that utilizes machine learning for estimation generation and accuracy improvement as described herein. The PI, which is a well property of a measure of the well potential of the well 102 or ability of the well 102 to produce, is calculated as follows:

$$J(\text{Productivity Index}) = \frac{Q}{P_r - P_{wf}} \quad \text{(EQUATION 1)}$$

Figure 5:
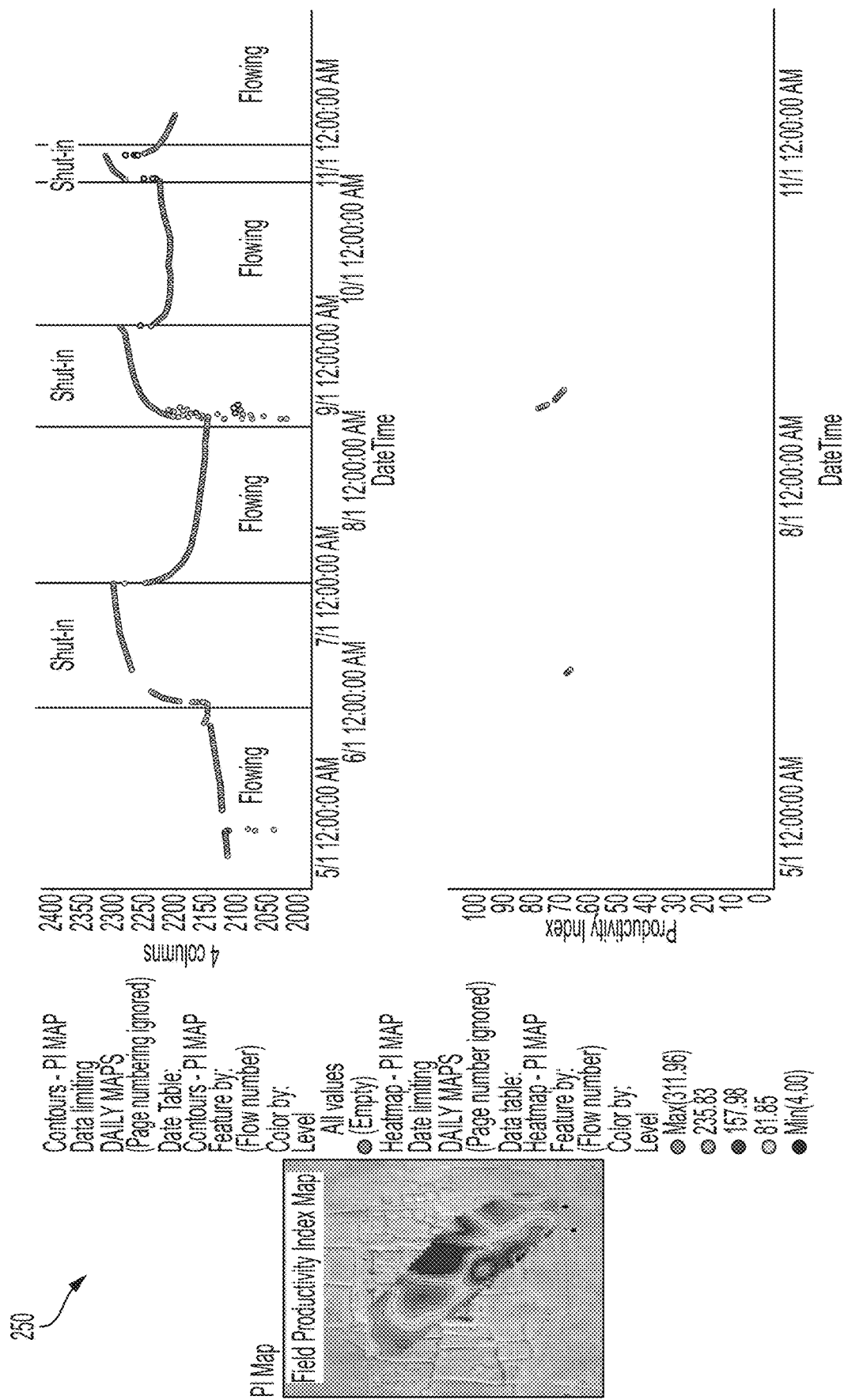
FIG. 5 illustrates a graphical depiction of field productivity index map results from an exemplary use of the process of FIG. 2, according to one or more embodiments shown and described herein.

In EQUATION 1 above, J is representative of the Productivity Index (PI) (e.g., in stock tank barrel per day per pounds per square inch (STB/day/psi)), Q is representative of surface flowrate at standard conditions (e.g., in STB/day), $P_r$ is representative of reservoir pressure (in psia), and $P_{wf}$ is representative of flowing bottomhole pressure (in psia). In particular, $P_r$ is the pressure point after the buildup is stabilized, and $P_{wf}$ is the last flowing pressure point before the buildup is initiated. All captured PI through history may be averaged to provide more accurate PI representation. FIG. 5, described in greater detail below, depicts a field productivity index map as graph 250 generated from the measurements of block 204.

Figure 6:
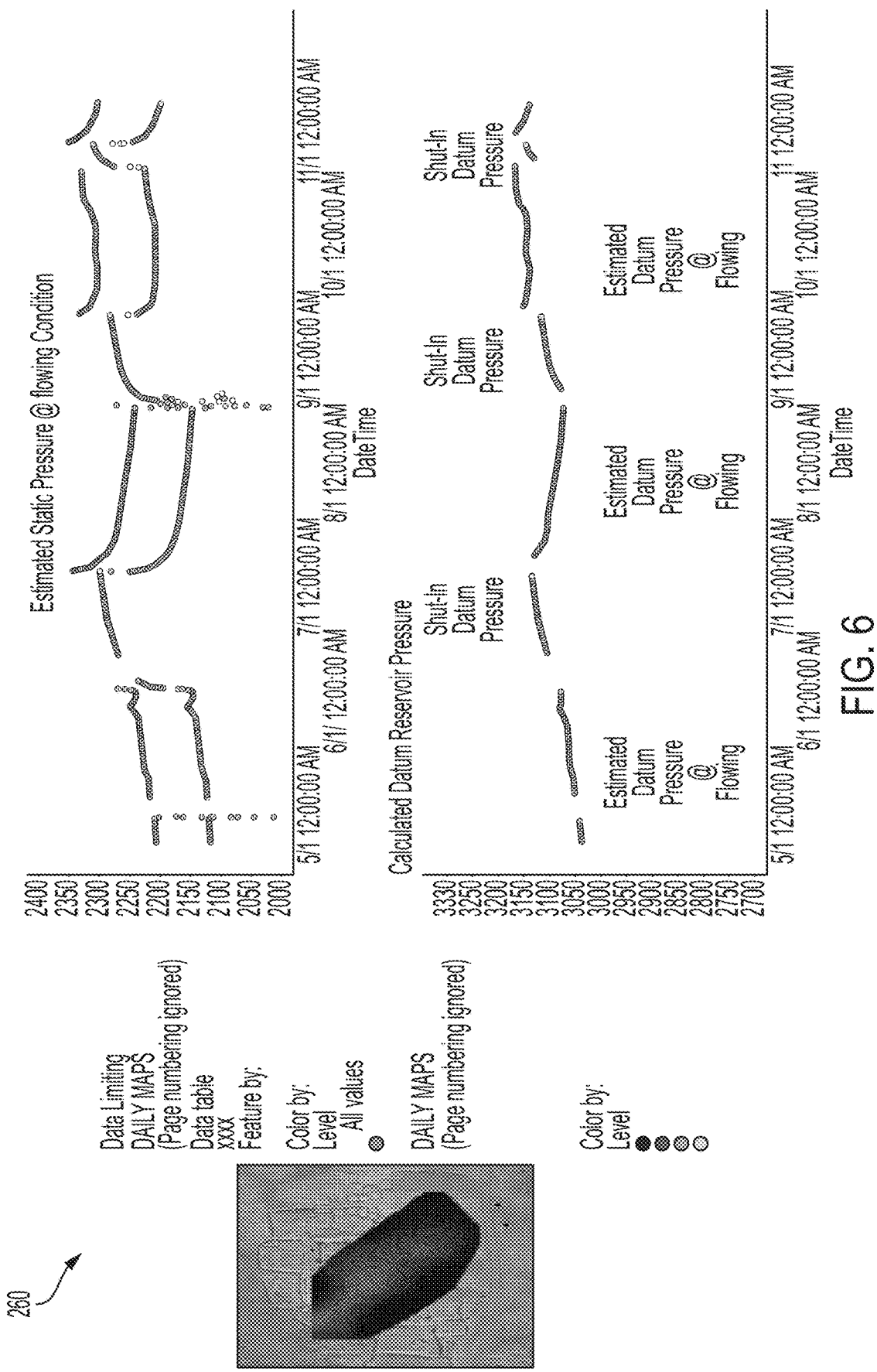
FIG. 6 illustrates a graphical depiction of field estimated static pressure at flowing condition map results from an exemplary use of the process of FIG. 2, according to one or more embodiments shown and described herein.

In block 206, reservoir pressure of the well 102 is automatically estimated at flowing and shut-in conditions for the well 102. FIG. 6, described in greater detail below, depicts a field estimated static pressure at flowing condition map as graph 260 generated from the measurements of block 206.

Having a designated PI for all wells with healthy smart field equipment and flowing and shut-in history, as well as accurate flowrate history, the estimated static bottom-hole reservoir pressure may be calculated at pressure sensor/gauge level and then converted into reservoir datum pressure per the following EQUATION 2 that is a re-arrangement of EQUATION 1.

$$P_r = \frac{Q}{J} + P_{wf} \quad \text{(EQUATION 2)}$$

An isobaric (reservoir pressure) map, such as shown in FIG. 6, may be generated utilizing the estimated static pressure at flowing condition, static pressure at shut-in conditions (e.g., as derived through the workflow 400), and data from a pre-existing dedicated pressure monitoring observation well 102. The map may be updated in real time and can rewind in time to track back the reservoir pressure history.

In block 208, real-time PI and reservoir pressure maps are displayed for the one or more wells 102, either individually or in combination. In embodiments, the maps may be displayed as isobaric pressure maps in real-time for a plurality of wells based on determined real-time PI values as described herein. Different color thresholds may be applied to different pressure and/or PI ranges to visually determine differences between pressures and PI values of wells in real-time. For examples, the graphs of FIGS. 5-6, described above and in greater detail below, may be displayed. Further, FIGS. 7-8, described in greater detail below, respectively depict as graphs 270 and 280 field estimate reservoir pressure results for different wells 102 generated in block 208.

A PI (Contour heat-map) may be generated for all completed reservoirs. If the well 102 has a PI generated and flowing and shut-in periods is captured for the well 102 and frequent rate measurement is acquired, the static pressure at flowing condition is estimated at gauge level via EQUATION 2 above. Pressure may be converted to datum pressure by using oil gradient for oil wells from PVTs or mixture gradient is used from a water cut (WC) estimation. An Isobaric (Contour heat-map) may be generated for all pressure estimation at flowing condition, shut-in condition, and direct measurements from observations.

Utilizing the process 200 disclosed herein, it is possible to obtain continuous real-time reservoir pressure and PI measurements despite a situation in which there is one flowmeter per drill site/platform, e.g., for multiple wells. This is possible because pressure/temperature sensors as described herein are very cost effective and readily available at the ground surface 104 and may be installed as part of wellhead sensors and at a bottom-hole area, such as installed as part of ESPs or a Permanent Down Hole Monitoring System (PDHMS).

Example 1

A validation experiment was conducted as EXAMPLE 1 in all wells in the field, resulting in excellent pressure estimation. The methodology of the process 200 was validated with nearby dedicated observation wells 102 with static bottom-hole pressure as well as shut-in bottom-hole pressure within the same well 102 during the same estimated periods as demonstrated in the EXAMPLE 1 mentioned. The well 102 had a good shut-in history with accurate rate measurement to calibrate the model, and fields with inaccurate rate measurements would converge way off pressure estimation and with inconsistent PI's.

The validation experiment of EXAMPLE 1 was conducted on four different fields and six different reservoirs. The results of EXAMPLE 1 showed excellent agreement between the method of process 200 and cross-validation data. The PI was cross checked with existing pressure transient analysis reports and the results were matching. The pressure estimation at flowing condition was also checked with shut-in surveys acquired within the same period with excellent match. Finally, a cluster of wells within the same area producers and dedicated observation was capturing similar trends as well as matching pressure values.

Referring to FIG. 3, a graph view 230 is depicted to display results from an exemplary use of the process 200 of FIG. 2 in EXAMPLE 1. In particular, FIG. 3 depicts the graph view 230 illustrating a daily standard deviation graph illustrating (1) a plot of sensor pressure SDTV values per day (e.g., as a rate) across a period of time and (2) a pressure with time graph illustrating sensor pressure (in pounds per square inch absolution (psia)) across the period of time. As reflected via FIG. 3, a statistical approach may be utilized to remove the noise in the sensors readings to capture the most representative values.

Referring to FIG. 4, a workflow 400 is depicted to display a workflow used in EXAMPLE 1 and that may be used with the process 200 to determine whether the well 102 is flowing or is in a shut-in condition, such as a hard or soft shut-in condition. In particular, the workflow 400 may be used to identify the well operation status of each well 102 utilizing a built workflow to track the exact pressure shut-in build ups periods and flowing periods of each well 102.

The workflow 400 may assist to identify exact pressure build-up periods of the well 102 and includes various steps that are performed to identify an operation stage of the well 102. In block 402, the workflow 400 first determines whether data in the form of an ESP differential pressure is available. Thereafter, in block 404, the workflow 400 determines whether the ESP differential pressure is greater than a high differential pressure threshold. For example, as shown in block 406, if the ESP differential pressure is higher than a high differential pressure threshold of 50 psi, then the well 102 is determined to be online, as indicated by block 408, and the ESP 108 is working, as indicated by block 410. Otherwise, the workflow 400 determines whether the ESP differential pressure is below a low differential pressure threshold. For example, as shown in block 414, if the ESP differential pressure is below a low differential pressure threshold of 10 psi, then the workflow 400 continues on to determine whether a choke upstream temperature (as indicated in block 416) is above a temperature cutoff (e.g., an ambient temperature), as indicated by block 418. If the choke upstream temperature is above the temperature cutoff, the well 102 is determined to be online, as indicated by block 420, and naturally flowing (e.g., the ESP 108 is determined to be working), as indicated by block 422. If the choke upstream temperature is below the temperature cutoff, as indicated by block 424, then the well 102 is offline, as indicated by block 426, and is determined to be in a shut-in condition (e.g. the ESP 108 is not working and the well 102 is not flowing), as indicated by block 428.

However, if the workflow 400 first determines data in the form of an ESP differential pressure is not available, as indicated by block 430, the workflow 400 proceeds to check the choke upstream temperature, as indicated by block 432. If the choke upstream temperature is available, as indicated by block 434, the workflow 400 proceeds to check if the choke upstream temperature is above the temperature cutoff, as indicated by block 436. If the choke upstream temperature is determined to be above the temperature, then the well 102 is determined to be online and flowing, as indicated by block 438. If, however, the choke upstream temperature is determined to be below the temperature cutoff, as indicated by block 440, the well 102 is determined to be offline, as indicated by block 442. However, in both instances, an i-field may be determined to be down, as indicted by blocks 444 and 446. If ESP differential pressure data is unavailable and the choke upstream temperature is also unavailable (e.g., an associated choke of the well 102 is not operating), as indicated by block 448, the i-field will be determined to be down and the operating status of well 102 will not be able to be determined, as indicated by block 450.

Referring to FIG. 5, a graph 250 is depicted to display results from an exemplary use of the process 200 of FIG. 2 in EXAMPLE 1. The graph 250 depicts a field productivity index map, such as generated for EXAMPLE 1 from the measurements of block 204 of the process 200 as described above. In an embodiment of EXAMPLE 1, and referring to FIG. 5, the productivity index may be determined using EQUATION 1 and referencing the graph 250 and based on a flowrate of 8170 STB/day as set forth below. For example, the first flowing period and the first shut-in period of the upper plot may be analyzed to find the corresponding result of 69 STB/day-psi shown in the lower plot of FIG. 5.

$$J(\text{Productivity Index}) = \frac{Q}{P_r - P_{wf}} = \frac{8170 \text{ STB/day}}{2266 \text{ psi} - 2148 \text{ psi}} = 69 \frac{\text{STB}}{\text{day psi}}$$

In the embodiment above, J is found to be 69 STB/day-psi, Q is 8170 STB/day, reservoir pressure $P_r$ is 2266 psi, and flowing bottomhole pressure $P_{wf}$ is 2148 psi.

Referring to FIG. 6, a graph 260 is depicted to display results from an exemplary use of the process 200 of FIG. 2 in EXAMPLE 1. The graph 260 depicts a field estimated static pressure at flowing condition map, such as generated for EXAMPLE 1 from the measurements of block 206 of the process 200 as described above. In the EXAMPLE 1 embodiment, and referring to FIG. 6 and the determine productivity index of 69 STB/day-psi, an estimated static bottom-hole reservoir pressure may be determined at gauge level and then converted into a reservoir datum pressure to determine an estimated Pr at flowing condition using EQUATION 2 as set forth below.

$$P_r = \frac{Q}{J} + P_{wf} = \frac{8170 \text{ STB/day}}{69 \frac{\text{STB}}{\text{day psi}}} + 2210 \text{ psi} = 2328 \text{ psi}$$

In the embodiment above, the estimated reservoir pressure Pr at flowing condition is found to be 2328 psi, which approximately corresponds to an end of the first shut-in period of FIGS. 5-6. Further, J is 69 STB/day-psi, Q is 8170 STB/day, reservoir pressure $P_r$ is 2266 psi, and the estimated static bottomhole pressure $P_{wf}$ is 2210 psi.

Figure 7:
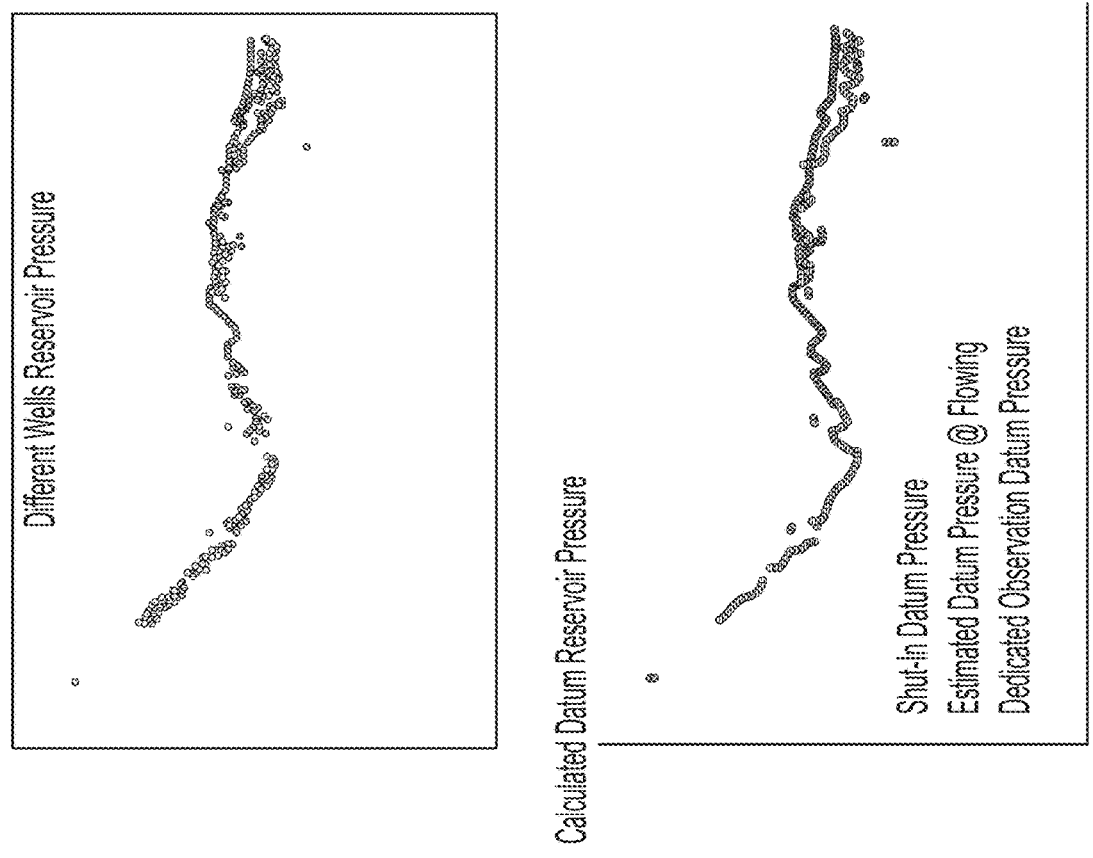
FIG. 7 illustrates a graphical depiction of field estimate reservoir pressure results for different wells results from an exemplary use of the process of FIG. 2, according to one or more embodiments shown and described herein.
Figure 7:
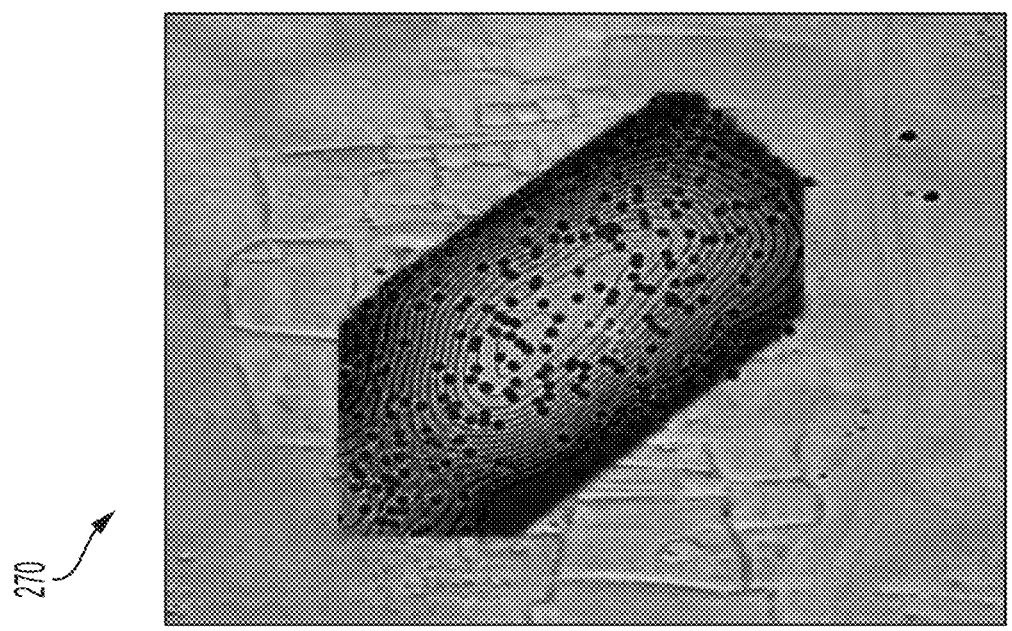

Referring to FIG. 7, a graph 270 is depicted to display results from an exemplary use of the process 200 of FIG. 2 in EXAMPLE 1. The graph 270 depicts field estimate reservoir pressure results for different wells 102, such as generated for EXAMPLE 1 from the measurements of block 208 of the process 200 as described above.

Figure 8:
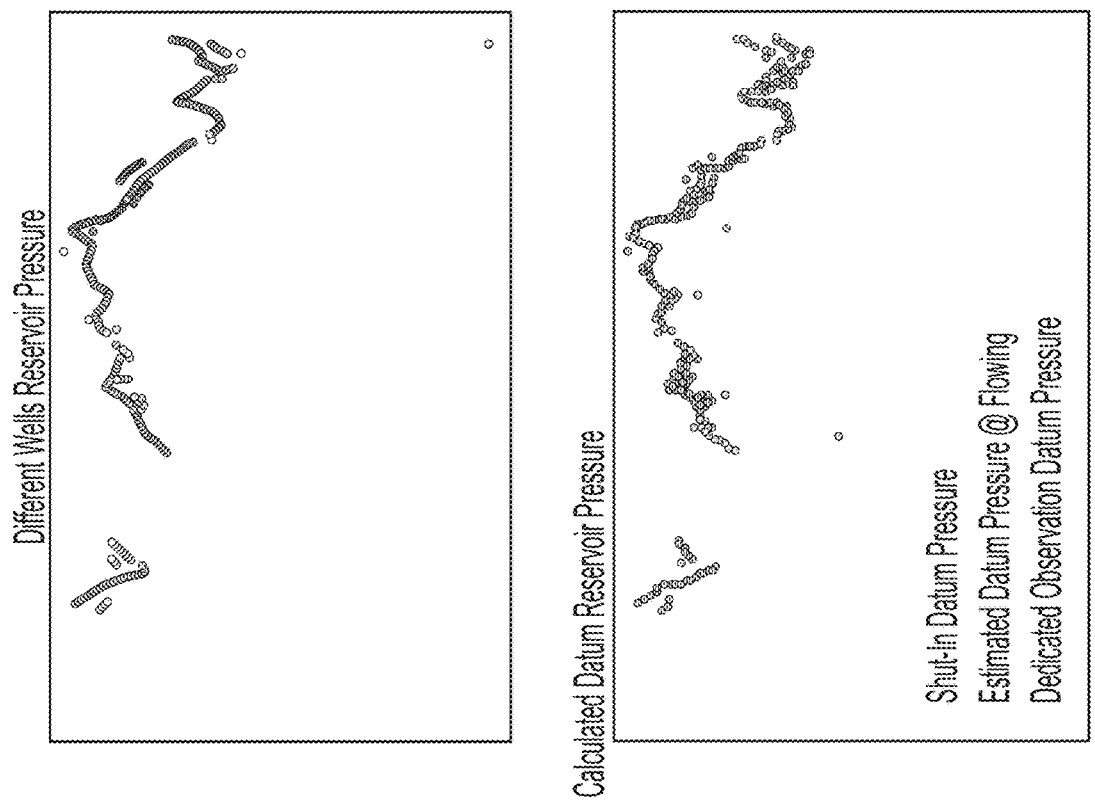
FIG. 8 illustrates a graphical depiction of other field estimate reservoir pressure results for different wells results from an exemplary use of the process of FIG. 2, according to one or more embodiments shown and described herein.
Figure 8:
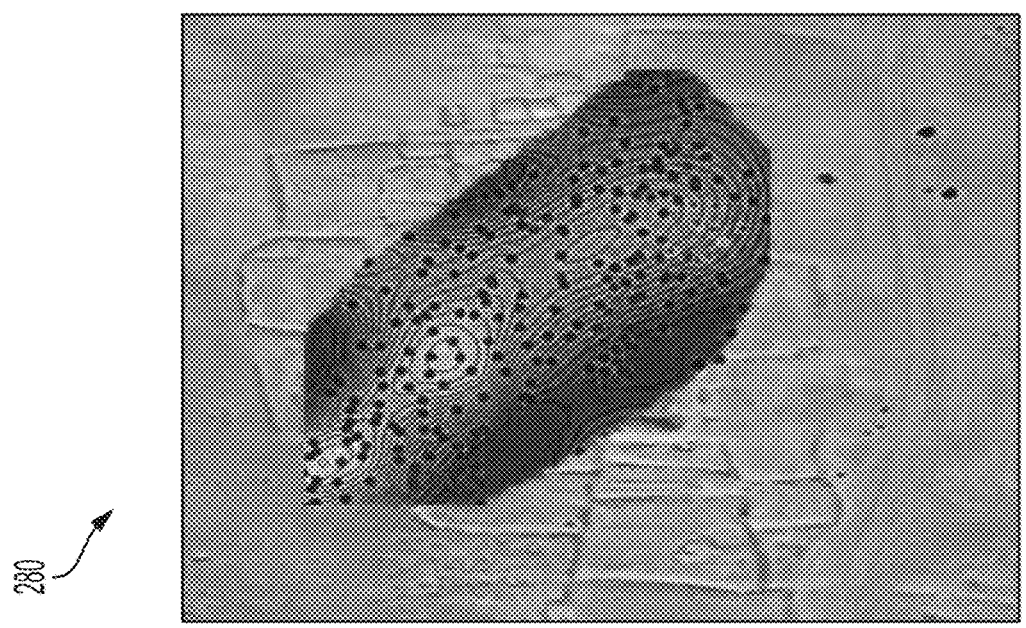

Referring to FIG. 8, a graph 280 is depicted to display results from an exemplary use of the process 200 of FIG. 2 in EXAMPLE 1. The graph 280 depicts field estimate reservoir pressure results for different wells 102, such as generated for EXAMPLE 1 from the measurements of block 208 of the process 200 as described above.

Figure 9:
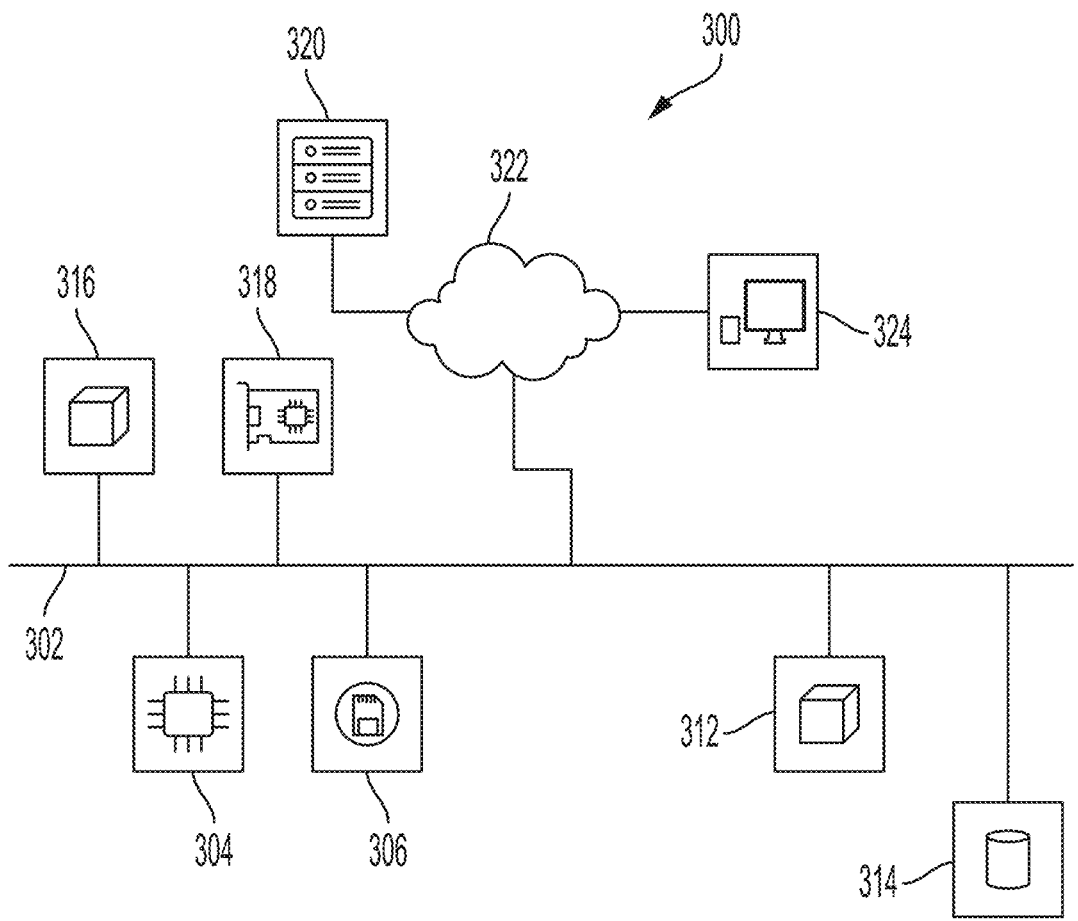
FIG. 9 illustrates a computer implemented system including an intelligent measurement module and for use with the process of FIG. 2 and the intelligent measurement solution of FIG. 1, according to one or more embodiments shown and described herein.

FIG. 9 illustrates a computer implemented intelligent measurement system 300 for use with the processes described herein, such as the process 200 of FIG. 2. Referring to FIG. 9, a non-transitory, intelligent measurement system 300 for implementing a computer and software-based method, such as directed by the intelligent measurement solution 100 and the process 200 described herein, to automatically generate an automated PI determination and reservoir pressure measurement as described herein. The intelligent measurement system 300 comprises an intelligent measurement module 312 as a component of the data analytics module 112 of FIG. 1 to generate the automated PI determination and reservoir pressure measurement.

The data analytics module 112 of FIG. 1 may be communicatively coupled to a "big data" environment including a database configured to store and process large volumes of data in such an environment. The database may be, for example, a structured query language (SQL) database or a like database that may be associated with a relational database management system (RDBMS) and/or an object-relational database management system (ORDBMS). The database may be any other large-scale storage and retrieval mechanism whether a SQL, SQL including, or a non-SQL database. For example, the database may utilize one or more big data storage computer architecture solutions. Such big data storage solutions may support large data sets in a hyperscale and/or distributed computing environment, which may, for example, include a variety of servers utilizing direct-attached storage (DAS). Such database environments may include Hadoop, NoSQL, and Cassandra that may be usable as analytics engines. Thus, while SQL may be referenced herein as an example database that is used with the tool described herein, it is understood that any other such type of database capable of supporting large amounts of database, whether currently available or yet-to-be developed, and as understood to those of ordinary skill in the art, may be utilized with the tool described herein as well.

The intelligent measurement system 300 further comprises a communication path 302, one or more processors 304, a non-transitory memory component 306, the intelligent measurement module 312, a storage or database 314, a machine learning module 316, a network interface hardware 318, a server 320, a network 322, and a computing device 324. The various components of the intelligent measurement system 300 and the interaction thereof will be described in detail below.

While only one server 320 and one computing device 324 is illustrated, the intelligent measurement system 300 can comprise multiple servers containing one or more applications and computing devices. In some embodiments, the intelligent measurement system 300 is implemented using a wide area network (WAN) or network 322, such as an intranet or the internet. The computing device 324 may include digital systems and other devices permitting connection to and navigation of the network 322. It is contemplated and within the scope of this disclosure that the computing device 324 may be a personal computer, a laptop device, a smart mobile device such as a smartphone or smart pad, or the like. Other intelligent measurement system 300 variations allowing for communication between various geographically diverse components are possible. The lines depicted in FIG. 9 indicate communication rather than physical connections between the various components.

The intelligent measurement system 300 comprises the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the intelligent measurement system 300. As used herein, the term "communicatively coupled" means that coupled components are capable of exchanging data signals with one another such as, for example, electrical signals via conductive medium, electromagnetic signals via air, optical signals via optical waveguides, and the like.

The intelligent measurement system 300 of FIG. 9 also comprises the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the intelligent measurement system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data.

The illustrated measurement system 300 further comprises the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 9, as noted above, the intelligent measurement system 300 comprises the display such as a graphical user interface (GUI) on a screen of the computing device 324 for providing visual output such as, for example, information, graphical reports, messages, or a combination thereof. The display on the screen of the computing device 324 is coupled to the communication path 302 and communicatively coupled to the processor 304. Accordingly, the communication path 302 communicatively couples the display to other modules of the intelligent measurement system 300. The display can comprise any medium capable of transmitting an optical output such as, for example, a cathode ray tube, light emitting diodes, a liquid crystal display, a plasma display, or the like. Additionally, it is noted that the display or the computing device 324 can comprise at least one of the processor 304 and the memory component 306. While the intelligent measurement system 300 is illustrated as a single, integrated system in FIG. 9, in other embodiments, the systems can be independent systems.

The intelligent measurement system 300 comprises the intelligent measurement module 312 as described above, to at least apply data analytics and artificial intelligence algorithms and models to received input data, and the machine learning module 316 for providing such artificial intelligence algorithms and models. The machine learning module 316 may include an artificial intelligence component to train and provide machine learning capabilities to a neural network as described herein. By way of example, and not as a limitation, a feedforward artificial neural network, such as a convolutional neural network (CNN), may be utilized. The intelligent measurement module 312 and the machine learning module 316 are coupled to the communication path 302 and communicatively coupled to the processor 304. As will be described in further detail below, the processor 304 may process the input signals received from the system modules and/or extract information from such signals.

Data stored and manipulated in the intelligent measurement system 300 as described herein is utilized by the machine learning module 316, which is able to leverage a cloud computing-based network configuration such as the cloud to apply Machine Learning and Artificial Intelligence. This machine learning application may create models that can be applied by the intelligent measurement system 300, to make it more efficient and intelligent in execution. As an example and not a limitation, the machine learning module 316 may include artificial intelligence components selected from the group consisting of an artificial intelligence engine, Bayesian inference engine, and a decision-making engine, and may have an adaptive learning engine further comprising a deep neural network learning engine.

The intelligent measurement system 200 comprises the network interface hardware 318 for communicatively coupling the intelligent estimation system 300 with a computer network such as network 322. The network interface hardware 318 is coupled to the communication path 302 such that the communication path 302 communicatively couples the network interface hardware 318 to other modules of the intelligent measurement system 300. The network interface hardware 318 can be any device capable of transmitting and/or receiving data via a wireless network. Accordingly, the network interface hardware 318 can comprise a communication transceiver for sending and/or receiving data according to any wireless communication standard. For example, the network interface hardware 318 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 9, data from various applications running on computing device 324 can be provided from the computing device 324 to the intelligent measurement system 300 via the network interface hardware 318. The computing device 324 can be any device having hardware (e.g., chipsets, processors, memory, etc.) for communicatively coupling with the network interface hardware 318 and a network 322. Specifically, the computing device 324 can comprise an input device having an antenna for communicating over one or more of the wireless computer networks described above.

The network 322 can comprise any wired and/or wireless network such as, for example, wide area networks, metropolitan area networks, the internet, an intranet, satellite networks, or the like. Accordingly, the network 322 can be utilized as a wireless access point by the computing device 324 to access one or more servers (e.g., a server 320). The server 320 and any additional servers generally comprise processors, memory, and chipset for delivering resources via the network 322. Resources can include providing, for example, processing, storage, software, and information from the server 320 to the intelligent measurement system 300 via the network 322. Additionally, it is noted that the server 320 and any additional servers can share resources with one another over the network 322 such as, for example, via the wired portion of the network, the wireless portion of the network, or combinations thereof.

In an embodiment, the intelligent measurement system 300 may include machine readable instructions stored in the memory component 306 communicatively coupled to the processor 204 to implement a control scheme such as the process 200 of FIG. 2, the workflow 400 of FIG. 4, or both. As described herein, the intelligent measurement system 300 may include at least two pressure sensors 106, 110, a neural network model (e.g., within data analytics module 112 and associated with the machine learning module 316), and a data processor 304. The at least two pressure sensors 106, 110 may be configured to generate pressure data respectively associated with two points of a well bore 102. The two points may be associated with (i) a surface point at the well surface 104 and (ii) a downhole point of the well bore 102 below and downhole of the well surface 104. The surface point may correspond to a surface placement of the pressure sensor 106, and the downhole point may correspond to a downhole placement of the pressure sensor 110. The neural network model may include historical flowrate data associated with the well bore 102. The data processor 304 may be communicatively coupled to the at least two pressure sensors 106, 110 and the neural network model and operate to implement a control scheme such as the process 200 of FIG. 2, the workflow 400 of FIG. 4, or both. As a non-limiting example, the data processor 304 may be operable to determine when the well bore 102 is in the flowing condition, the shut-in condition, or both, based on the pressure data and received temperature data to identify exact pressure build-up periods indicative of the shut-in condition using the workflow 400.

As described in embodiments herein, the data processor 304 may be operable to receive the pressure data from the at least two pressure sensors 106, 110 respectively indicative of pressure at each of the two points of the well bore 102, estimate a real-time productivity index value in real-time based on the pressure data from the at least two pressure sensors 106, 110 and the historical flowrate data of the neural network model, and estimate a reservoir pressure value of the well bore at a flowing condition, a reservoir pressure value of the well bore 102 at a shut-in condition, or both, based on the real-time productivity index.

In embodiments, the data processor 304 is operable to estimate the real-time productivity index for the well bore 102 by solving EQUATION 1 as set forth herein and above. In aspects of EQUATION 1, J is representative of the real-time productivity index value, Q is representative of a surface flowrate at standard conditions for the well bore, $P_r$ is representative of a reservoir pressure for the well bore, and $P_{wf}$ is representative of a flowing bottomhole pressure for the well bore. The intelligent measurement system 300 may further include a flowmeter 114 configured to provide a flowrate associated with the well bore 102, such that Q is representative of a surface flowrate at standard conditions for the well bore 102 based on the flowrate from the flowmeter 114. Further, Q may be based on the historical flowrate data, $P_r$ may be an input associated with a pressure point after a pressure buildup is stabilized and based on the pressure data, and $P_{wf}$ may be an input associated with a last flowing pressure point before the pressure buildup is initiated and based on the pressure data.

The data processor 304 may further be operable to generate a productivity index graphical representation including the real-time productivity index value for the well bore 102, and display the productivity index graphical representation in real-time. The displayed productivity index graphical representation (such as the graph 250 of FIG. 5) may include each real-time productivity index value for a plurality of well bores 102.

The data processor 304 may further be operable to generate a reservoir pressure graphical representation including the reservoir pressure value of the well bore 102 at the flowing condition, the reservoir pressure value of the well bore 102 at the shut-in condition, or both, and display the reservoir pressure graphical representation. The displayed reservoir pressure graphical representation (such as graphs 260, 270, 280 of FIGS. 6-8) may include each reservoir pressure value of each well bore 102 at the flowing condition, the shut-in condition, or both, for the plurality of well bores 102.

The intelligent measurement solution systems and methods as described herein may provide operation status per well (flowing or shut-in) in real-time, capture all historical (planned or unplanned) production buildups and drawdowns autonomously, provide estimated productivity index (PI) autonomously, provides estimated reservoir pressure for oil producers at flowing conditions and/or at shut-in conditions, provides historical and real time pressure trends that can be visualized individually or with a cluster of nearby well, provide high resolution real time PI and reservoir pressure maps that change with time, and/or can be implemented in many fields utilizing pressure and temperature sensors and an estimated liquid gross rate. In embodiments, the intelligent measurement solution systems and methods as described herein may provide continuous reservoir pressure from oil producers while flowing, and further, when mapped, may show reservoir features in real-time, while further observing and displaying interferences between nearby wells, effect of power water injectors, and/or natural reservoir boundaries to balance the production and injection aerially to permit optimized, uniform reservoir depletion.

The intelligent measurement solution systems and methods as described herein assist to significantly reduce inefficiencies associated with well reservoir pressure and Productivity Index estimation to result in faster and cost-effective measurement estimation, for example. The present disclosure provides systems, methods, and computer programs for such estimations of one or more wells in real-time from indirect measurements such as temperature and pressure from one or more sensors as described herein through utilizing a data-driven machine learning approach as described herein. This present disclosure describes recording bottom hole flowing pressure with high frequency as high as seconds and algorithms to convert the recorded pressure into an estimated static reservoir pressure. All pressure trends are captured in real time through an automated process 200 based on installed sensors 106, 110 and that does not require intervention or production interruption while being cost effective. The intelligent measurement solution systems and methods thus provide a more efficient processing system to efficiently and automatically handle such reservoir pressure and Productivity Index measurement estimation determinations in real-time, effectively reducing a use of processing power while optimizing system usage and efficiencies, while shortening the time to produce related reservoir pressure and Productivity Index measurement estimation determinations.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An intelligent estimation system comprising at least two pressure sensors, a neural network model, and a data processor, wherein:
the at least two pressure sensors are configured to generate well parameters comprising at least pressure data respectively associated with two points of a well bore, the two points comprising a surface point of the well bore and a downhole point of the well bore, wherein the well parameters further comprise at least a measured or estimated bottomhole pressure of the well bore;
the neural network model comprises historical flowrate data associated with at least the well bore; and the data processor is communicatively coupled to the at least two pressure sensors and the neural network model and is operable to:

receive the well parameters comprising (i) the pressure data from the at least two pressure sensors respectively indicative of pressure at each of the two points of the well bore and (ii) the measured or estimated bottomhole pressure of the well bore, estimate a real-time productivity index value in real-time based on (i) the well parameters comprising the pressure data from the at least two pressure sensors and the measured or estimated bottomhole pressure of the well bore and (ii) the historical flowrate data of the neural network model, and estimate a reservoir pressure value of the well bore at a flowing condition, a reservoir pressure value of the well bore at a shut-in condition, or both, based on the real-time productivity index.

2. The intelligent estimation system of claim 1, wherein the data processor is operable to estimate the real-time productivity index by solving:

$$J(\text{Productivity Index}) = \frac{Q}{P_r - P_{wf}},$$

wherein J is representative of the real-time productivity index value, Q is representative of a surface flowrate at standard conditions for the well bore, $P_r$ is representative of a reservoir pressure for the well bore, and $P_{wf}$ is representative of a flowing bottomhole pressure for the well bore.

3. The intelligent estimation system of claim 2, wherein Q is based on the historical flowrate data, $P_r$ is an input associated with a pressure point after a pressure buildup is stabilized and based on the pressure data, and $P_{wf}$ is an input associated with a last flowing pressure point before the pressure buildup is initiated and based on the pressure data.

4. The intelligent estimation system of claim 1, further comprising a flowmeter configured to provide a flowrate associated with the well bore, wherein the data processor is operable to estimate the real-time productivity index by solving:

$$J(\text{Productivity Index}) = \frac{Q}{P_r - P_{wf}},$$

wherein J is representative of the real-time productivity index value, Q is representative of a surface flowrate at standard conditions for the well bore based on the flowrate from the flowmeter, $P_r$ is representative of a reservoir pressure for the well bore, and $P_{wf}$ is representative of a flowing bottomhole pressure for the well bore.

5. The intelligent estimation system of claim 1, wherein the data processor is further operable to:

generate a productivity index graphical representation including the real-time productivity index value for the well bore; and display the productivity index graphical representation in real-time.

6. The intelligent estimation system of claim 5, wherein the data processor is further operable to:

display the productivity index graphical representation comprising each real-time productivity index value for a plurality of well bores, the plurality of well bores comprising the well bore.

7. The intelligent estimation system of claim 1, wherein the data processor is further operable to:

generate a reservoir pressure graphical representation including the reservoir pressure value of the well bore at the flowing condition, the reservoir pressure value of the well bore at the shut-in condition, or both; and display the reservoir pressure graphical representation.

8. The intelligent estimation system of claim 7, wherein the data processor is further operable to:

display the reservoir pressure graphical representation comprising each reservoir pressure value of each well bore at the flowing condition, the shut-in condition, or both, for a plurality of well bores, the plurality of well bores comprising the well bore.

9. The intelligent estimation system of claim 1, wherein the data processor is operable to determine when the well bore is in the flowing condition, the shut-in condition, or both, based on the pressure data and received temperature data to identify exact pressure build-up periods indicative of the shut-in condition.

10. An intelligent estimation system comprising at least two pressure sensors, a neural network model, and a data processor, wherein:

the at least two pressure sensors are configured to generate well parameters comprising at least pressure data respectively associated with two points of a well bore, the two points comprising a surface point of the well bore and a downhole point of the well bore of a plurality of well bores, the well parameters further comprising at least a measured or estimated bottomhole pressure of the well bore of the plurality of well bores;

the neural network model comprises historical flowrate data associated with at least the well bore of the plurality of well bores; and the data processor is communicatively coupled to the at least two pressure sensors and the neural network model and is operable to:

receive the well parameters comprising (i) the pressure data from the at least two pressure sensors respectively indicative of pressure at each of the two points of the well bore and (ii) the measured or estimated bottomhole pressure of the well bore, estimate a real-time productivity index value of the well bore in real-time based on (i) the well parameters comprising the pressure data from the at least two pressure sensors and the measured or estimated bottomhole pressure of the well bore (ii) and the historical flowrate data of the neural network model, estimate a reservoir pressure value of the well bore at a flowing condition, a reservoir pressure value of the well bore at a shut-in condition, or both, based on the real-time productivity index, generate (i) a productivity index graphical representation comprising each real-time productivity index value for each well bore of the plurality of well bores, (ii) a reservoir pressure graphical representation comprising each reservoir pressure value of each well bore, (iii) or both; and display the productivity index graphical representation, the reservoir pressure graphical representation, or both.

11. The intelligent estimation system of claim 10, further comprising a flowmeter configured to provide a flowrate associated with the well bore, wherein the data processor is operable to estimate the real-time productivity index by solving:

$$J(\text{Productivity Index}) = \frac{Q}{P_r - P_{wf}},$$

wherein J is representative of the real-time productivity index value, Q is representative of a surface flowrate at standard conditions for the well bore based on the flowrate from the flowmeter, $P_r$ is representative of a reservoir pressure for the well bore, and $P_{wf}$ is representative of a flowing bottomhole pressure for the well bore.

12. The intelligent estimation system of claim 11, wherein Q is further based on the historical flowrate data, $P_r$ is an input associated with a pressure point after a pressure buildup is stabilized and based on the pressure data, and $P_{wf}$ is an input associated with a last flowing pressure point before the pressure buildup is initiated and based on the pressure data.

13. The intelligent estimation system of claim 10, wherein the data processor is further operable to:
generate the reservoir pressure graphical representation including the reservoir pressure value of the well bore at the flowing condition, the reservoir pressure value of the well bore at the shut-in condition, or both.

14. The intelligent estimation system of claim 13, wherein the data processor is further operable to:
display the reservoir pressure graphical representation, the reservoir pressure graphical representation comprising each reservoir pressure value of each well bore at the flowing condition, the shut-in condition, or both, for the plurality of well bores.

15. The intelligent estimation system of claim 10, wherein the data processor is operable to determine when the well bore is in the flowing condition, the shut-in condition, or both, based on the pressure data and received temperature data to identify exact pressure build-up periods indicative of the shut-in condition.

16. A method comprising:
generating well parameters comprising at least pressure data respectively associated with two points of a well bore from at least two pressure sensors, the two points comprising a surface point of the well bore and a downhole point of the well bore, the well parameters further comprising at least a measured or estimated bottomhole pressure of the well bore;
receiving historical flowrate data associated with at least the well bore from a neural network model;
receiving the well parameters comprising (i) the pressure data from the at least two pressure sensors respectively indicative of pressure at each of the two points of the well bore and (ii) the measured or estimated bottomhole pressure of the well bore;
estimating a real-time productivity index value of the well bore in real-time based on (i) the well parameters comprising the pressure data from the at least two pressure sensors and the measured or estimated bottomhole pressure of the well bore and (ii) the historical flowrate data of the neural network model; and
estimating a reservoir pressure value of the well bore at a flowing condition, a reservoir pressure value of the well bore at a shut-in condition, or both, based on the real-time productivity index.

17. The method of claim 16, further comprising receiving a flowrate associated with the well bore from a flowmeter, and wherein the estimating of the real-time productivity index based on solving:

$$J(\text{Productivity Index}) = \frac{Q}{P_r - P_{wf}},$$

wherein J is representative of the real-time productivity index value, Q is representative of a surface flowrate at standard conditions for the well bore based on the flowrate from the flowmeter, $P_r$ is representative of a reservoir pressure for the well bore, and $P_{wf}$ is representative of a flowing bottomhole pressure for the well bore.

18. The method of claim 16, further comprising:
generating a productivity index graphical representation including the real-time productivity index value for the well bore; and
displaying the productivity index graphical representation in real-time.

19. The method of claim 18, further comprising:
displaying the productivity index graphical representation comprising each real-time productivity index value for a plurality of well bores, the plurality of well bores comprising the well bore.

20. The method of claim 16, further comprising determining when the well bore is in the flowing condition, the shut-in condition, or both, based on the pressure data and received temperature data to identify exact pressure build-up periods indicative of the shut-in condition.

* * * * *